M. T. CROSBY.
FISH OR FOWL LIFTER.
APPLICATION FILED AUG. 30, 1915.
1,263,863.
Patented Apr. 23, 1918.
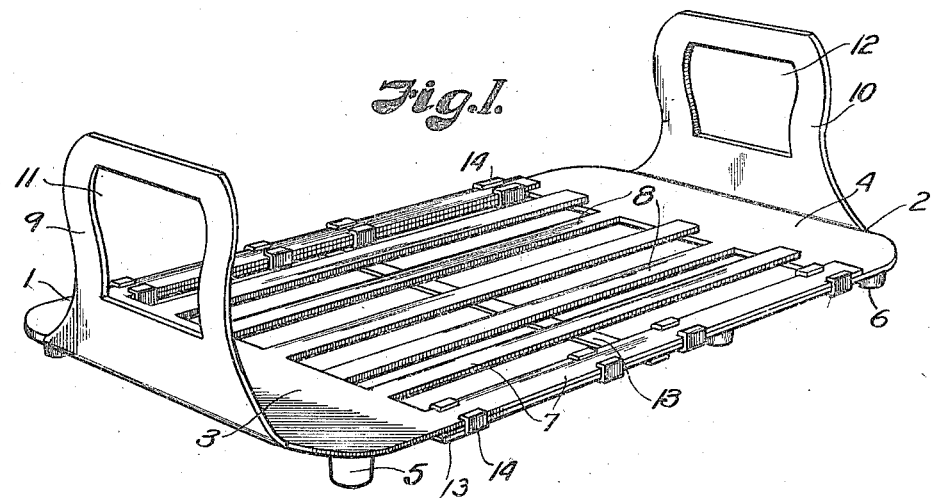
Fig. I.
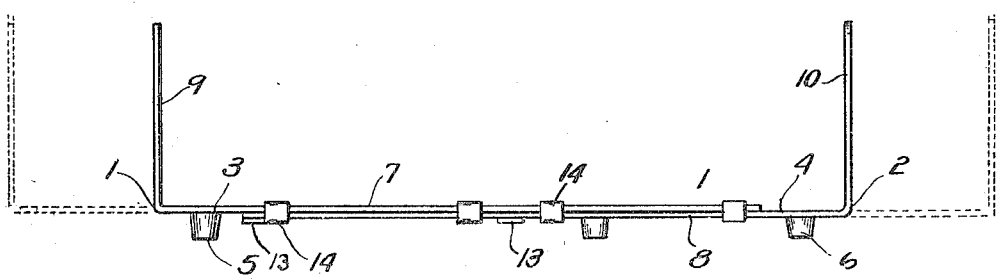
Fig. II.
Inventor
May T. Crosby.
Arthur C. Brown.
Attorney

UNITED STATES PATENT OFFICE.

MAY T. CROSBY, OF KANSAS CITY, MISSOURI.

FISH OR FOWL LIFTER.

1,263,863.

Specification of Letters Patent.

Patented Apr. 23, 1918.

Application filed August 30, 1915. Serial No. 48,017.

*To all whom it may concern:*

Be it known that I, MAY T. CROSBY, a citizen of the United States, residing at Kansas City, in the county of Jackson and State of Missouri, have invented certain new and useful Improvements in Fish or Fowl Lifters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a fish or fowl lifter and has for its principal object to provide a device for supporting a fish, fowl or other edible article while the same is being roasted or cooked and by means of which the said article may be lifted from a roaster or other cooking vessel and delivered to a platter without breaking or marring the formation of such article.

In accomplishing this object I have provided improved details of structure, the preferred forms of which are illustrated in the accompanying drawing, wherein:

Figure I is a perspective view of a lifter containing my improvements.

Fig. II is an edge view of the same.

Referring more in detail to the drawing:

1—2 designates separate body members comprising the solid base portions 3—4, having short supporting legs 5—6 whereby the separate body members may be supported upon the bottom of a roaster or other cooking vessel, and each having relatively long arms 7—8 projecting from their forward edges, and upstanding handle portions 9—10 at their rear edges; the handle portions having recesses 11—12 through which the fingers of a person's hand may be projected to facilitate the lifting of the device and carrying of the fish or other edible article from the cooking vessel to the platter.

The arms 8 are connected by one or more underlying straps 13 to form supporting members for the arm 7 of the body 1, and some of the arms 8, preferably those at the outer edges of the body, are provided with slide collars 14, through which the arms 7 of the body 1 may be projected in order to lock the bodies together while permitting free longitudinal sliding movement thereof, relative to each other. The arms 7 of the body 1 may project over and lie on the base 4 of the body 2 to form a support for the free ends of the arms 7, it being apparent that as the free ends of the arms 8 are connected by a cross strap 13 and as the outer arms 8 are connected to the outer arms 7 by the slide collars 14, all of the arms are supported with sufficient rigidity to hold the fish or other article in proper position in the roaster or cooking vessel.

In using the device, the separate body members are assembled by projecting the outer arms 7 through the collars 14 of the arms 8 and moving the same toward each other until the free ends of the arms 7 rest on the body 4 of the body 2. The device is then placed in the roasting pan or other cooking vessel, where it is supported above the bottom of the vessel by the legs 5—6. The fish, fowl or other edible article is then placed on the arms 7—8 and supported thereby, above the bottom of the cooking vessel, but so that heated air may circulate between the arms and contact with the article being cooked, the device in this respect resembling a grill. When the article is roasted or cooked and is to be removed from the cooking vessel, a person removing the article grasps the handles 9—10 of the separate body members and lifts the same out of the vessel, the article being lifted on the arms without breaking the formation, as the arms form a substantial base upon which the article rests. The device is then suspended over a platter, or the like, and the body members pulled apart so that the arms lie beneath the fish or other article in close proximity to the platter so that as they are pulled from beneath the fish or other article, the latter is lowered easily on the platter.

It is apparent that as the arms are raised together and move in opposite directions when the separate body members are separated, the fish or other article will not stick to the arms of either body member more than to the other, so that both body members are loosened from the fish simultaneously and are entirely separated to deliver the fish or other article onto the platter without breaking its formation.

Having thus described my invention, what I claim as new therein, and desire to secure by Letters-Patent is:—

In a device of the character described, the combination of paired, separable members, each having a horizontal base and upstanding handle portions; the base of each body member having spaced, longitudinal arms, some of the arms of one member dividing the space between those of the other member and some overlying the arms of the other member, and means on some of the arms of one body member for slidably retaining the overlying arms of the other body member to form an extensible grilled support substantially as set forth.

In testimony whereof I affix my signature.

MAY T. CROSBY.

Copies of this patent may be obtained for five cents each, by addressing the "Commissioner of Patents, Washington, D. C."